C. WILLIAMS.
LUBRICATOR.
APPLICATION FILED JULY 8, 1909.
992,091.  Patented May 9, 1911.
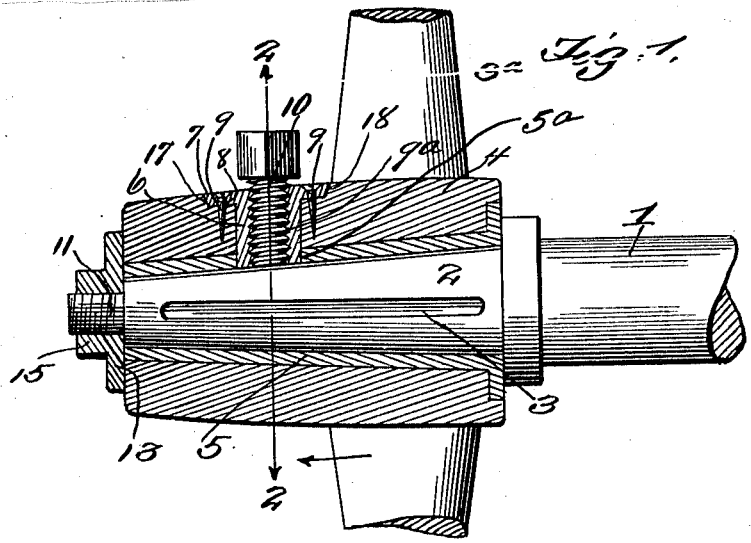
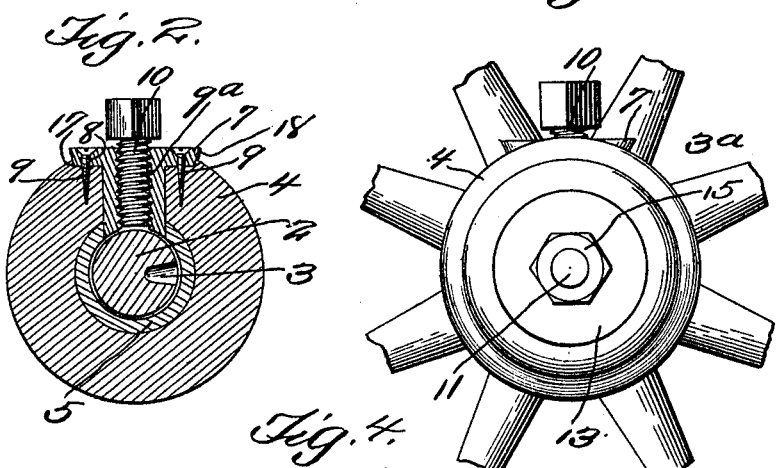
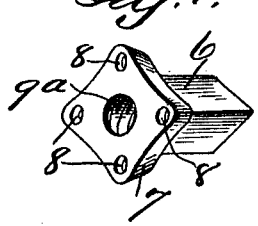

UNITED STATES PATENT OFFICE.

CHRISTIAN WILLIAMS, OF WITTENBERG, WISCONSIN.

LUBRICATOR.

992,091.  Specification of Letters Patent.  Patented May 9, 1911.

Application filed July 8, 1909. Serial No. 506,591.

*To all whom it may concern:*

Be it known that I, CHRISTIAN WILLIAMS, a citizen of the United States, residing at Wittenberg, in the county of Shawano and State of Wisconsin, have invented a new and useful Lubricator; and I do hereby declare the following to be a full, clear, and exact description of the invention, such as will enable others skilled in the art to which it appertains to make and use the same.

The invention about to be set forth pertains to a new and useful lubricating device or means for wheels and similar devices, especially wagon wheels; the invention aims as its essential object to provide an improved device of this design, which is simple and efficient in construction and durable, as will be readily observed.

The invention aims as a further object to provide means whereby lubricants may be applied to the spindle of an axle without removing the wheel therefrom, and further to provide means by which the oil gutter or groove of the spindle of the axle is closed at its end, so as to hold the lubricant in said gutter or groove.

Another object of the invention is to provide means disposed radially of the hub of the wheel, for the reception of a screw bolt, which may be removed for the insertion of lubricant.

To obtain a full and correct understanding of the details of construction, combining of features, elements and advantages, reference is to be had to the hereinafter set forth description and accompanying drawings in connection therewith, wherein—

Figure 1 is a sectional view through the hub of a wheel, showing the same mounted upon a spindle of an axle. Fig. 2 is a sectional view upon line 2—2 of Fig. 1. Fig. 3 is a face view of the wheel, showing the means for retaining the same upon the spindle.

In regard to the annexed drawings, 1 designates an axle of a vehicle, which is provided with the usual spindle 2. This spindle is provided with a single oil gutter 3, for the purpose of containing suitable lubricant.

Mounted upon the spindle 2 is the usual wheel 3ª, having the ordinary hub 4. This hub is provided with an inner casing 5, which is designed to engage the spindle. Extending through the hub radially is a casing 6, which is substantially rectangular in section, and is provided with a flanged portion 7, having apertures 8, through which suitable screws 9 extend. These screws penetrate sufficiently so as to thoroughly engage the hub of the wheel, in order to prevent displacement of the casing 6. The casing 6 is long enough in order to extend into an aperture 5ª of the casing 5, so as to prevent rotary displacement of said casing 5. This casing 6 is provided with a hollow threaded inner surface 9ª, for the reception of the screw bolt 10, which may be removed when desired for the insertion of lubricant, as shown clearly in Fig. 1 of the drawings.

The spindle 2 is provided with an extended restricted threaded portion 11. A nut 15 is threaded to the portion 11 and is provided with a suitable flange 13, to engage the hub of the wheel, in order to hold the wheel in place and at the same time prevent the escape of the oil.

From the foregoing, the essential features, elements and the operation of the device, together with the simplicity, thereof will be clearly apparent.

The flange 7 of the casing 6 is seated within a recess 17 of the hub, and the periphery of the said flange is slightly beveled, as shown at 18, in order to fit the recess snugly.

Having thus fully described the invention, what is claimed as new and useful is:—

A lubricating device comprising in combination with an axle having a groove therein, a wheel, a hub, a receptacle sunk in said hub for a lubricant and having its external surface of angular form to prevent rotation, said receptacle having its lower end concaved, an integral flange at the upper end of said receptacle, having screw-holes therein, screws adapted to pass through the screw-holes to enter said hub, screw threads on the interior of said receptacle a pusher mounted therein, complemental threads on said pusher, and a square head on said pusher.

In testimony whereof I have signed my name to this specification in the presence of two subscribing witnesses.

CHRISTIAN WILLIAMS.

Witnesses:
E. J. BOST,
G. SELMER SCHLYTTER.

Copies of this patent may be obtained for five cents each, by addressing the "Commissioner of Patents, Washington, D. C."